(12) United States Patent
Jurkovic et al.

(10) Patent No.: US 8,487,494 B2
(45) Date of Patent: Jul. 16, 2013

(54) INTERIOR PERMANENT MAGNET MACHINE WITH RADIALLY ASYMMETRIC MAGNET CONFIGURATION

(75) Inventors: Sinisa Jurkovic, Sterling Heights, MI (US); Khwaja M. Rahman, Troy, MI (US); Xinyu Zhou, Troy, MI (US); Xu Han, Novi, MI (US); Qiang Niu, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 37 days.

(21) Appl. No.: 13/238,008

(22) Filed: Sep. 21, 2011

(65) Prior Publication Data

US 2013/0069470 A1 Mar. 21, 2013

(51) Int. Cl.
*H02K 1/27* (2006.01)
(52) U.S. Cl.
USPC ............ 310/156.53; 310/156.56; 310/156.57
(58) Field of Classification Search
USPC ........................... 310/156.53, 156.01–156.84
See application file for complete search history.

(56) References Cited

U.S. PATENT DOCUMENTS

| 7,474,029 B2 | 1/2009 | Rahman et al. |
| 2007/0096578 A1* | 5/2007 | Jahns et al. ............... 310/156.53 |
| 2009/0224615 A1* | 9/2009 | Komuro et al. .................. 310/46 |
| 2010/0213781 A1 | 8/2010 | Rahman et al. |

* cited by examiner

*Primary Examiner* — Tran Nguyen
*Assistant Examiner* — Leda Pham
(74) *Attorney, Agent, or Firm* — Quinn Law Group, PLLC

(57) ABSTRACT

An interior permanent magnet machine is provided with a rotor that includes a plurality of slots and at least one barrier defined by the plurality of slots. A plurality of first and second magnets are disposed within the barrier. The rotor is configured such that at least one of the first magnets is located at a different radial distance from the center of the rotor relative to at least one of the second magnets. The rotor may be configured to produce an averaging effect similar to that achieved through traditional skewing of rotor magnets. The rotor includes a plurality of poles defined by respective pole axes in the rotor and may be configured to reflect radial asymmetry between poles (pole-to-pole) and/or radial asymmetry within a pole.

8 Claims, 1 Drawing Sheet

INTERIOR PERMANENT MAGNET MACHINE WITH RADIALLY ASYMMETRIC MAGNET CONFIGURATION

TECHNICAL FIELD

The present invention relates generally to an interior permanent magnet machine, and more particularly, to the configuration of the rotor in the interior permanent magnet machine.

BACKGROUND

An interior permanent magnet machine generally includes a rotor having a plurality of magnets of alternating polarity around the outer periphery of the rotor. The rotor is rotatable within a stator which generally includes a plurality of windings and magnetic poles of alternating polarity. Traditionally, the configuration of magnets in interior permanent magnet machines is radially symmetric, i.e., exhibiting symmetry with respect to the origin. Permanent magnet machines may produce undesirable torque ripple, resulting in unwanted vibration and noise. Traditionally, the magnets in the rotor are skewed to reduce torque ripple, for example, by placing the magnets at an axial angle relative to one another or rotating the magnets in steps. However, skewing may make rotor manufacturing more complicated.

SUMMARY

An interior permanent magnet machine is provided with a rotor that includes a plurality of slots and at least one barrier defined by the plurality of slots. A plurality of first and second magnets are disposed within the barrier. The rotor is configured such that at least one of the first magnets is located at a different radial distance from the center of the rotor relative to at least one of the second magnets. The rotor may be configured to produce an averaging effect similar to that achieved through traditional skewing of rotor magnets. The rotor includes a plurality of poles defined by respective pole axes in the rotor and may be configured to reflect radial asymmetry between poles (pole-to-pole) and/or radial asymmetry within a pole.

In one embodiment, the first magnets are disposed within a first pole while the second magnets are disposed within a second pole, thereby exhibiting pole-to-pole radial asymmetry. Each of the first magnets may be located at a different radial distance from the center relative to each of the second magnets. The radially asymmetric configuration of the first and second magnets may be achieved by employing a radially asymmetric configuration of slots within the rotor. The rotor may include first and second slots provided in a first pole and located at first and second distances from the center, respectively. Third and fourth slots may be provided in the second pole and located at third and fourth distances from the center, respectively. The rotor is configured such that at least one of the first and second distances is different from at least one of the third and fourth distances. The first, second, third and fourth distances may each be different with respect to one another.

In another embodiment, the rotor includes a plurality of slots defining first and second barriers. A plurality of first magnets are disposed within a first barrier in a first pole such that at least one of the first magnets is located at a different radial distance from the center relative to another of the first magnets. A plurality of second magnets are disposed within the second barrier in the first pole such that at least one of the second magnets is located at a different radial distance from the center relative to another of the second magnets, thereby exhibiting radial asymmetry within a pole. Each of the first magnets may be located at a different radial distance from the center relative to each of the second magnets. This radially asymmetric configuration of the first and second magnets may be achieved by employing a radially asymmetric configuration of slots within the rotor.

The rotor may include radially-inner first and second slots provided in a first pole and located at first and second distances from the center, respectively. Radially-outer third and fourth slots may be provided in the first pole and located at third and fourth distances from the center, respectively. Each of the first, second, third and fourth distances may be different with respect to one another. In one example, the first distance may be different from the second distance while the third distance may be the same as the fourth distance. In another example, the third distance may be different from the fourth distance while the first distance may be the same as the second distance.

The rotor may include radially-inner fifth and sixth slots provided in a second pole and located at fifth and sixth distances from the center, respectively. The rotor may include radially-outer seventh and eighth slots provided in the second pole and located at seventh and eighth distances from the center, respectively. In one example, the fifth distance may be different from the sixth distance while the seventh distance may be the same as the eighth distance. In another example, the seventh distance may be different from the eighth distance while the fifth distance may be the same as the sixth distance. Each of the eight distances may be different from one another.

The above features and advantages and other features and advantages of the present invention are readily apparent from the following detailed description of the best modes for carrying out the invention when taken in connection with the accompanying drawings.

DETAILED DESCRIPTION

Figure 1:
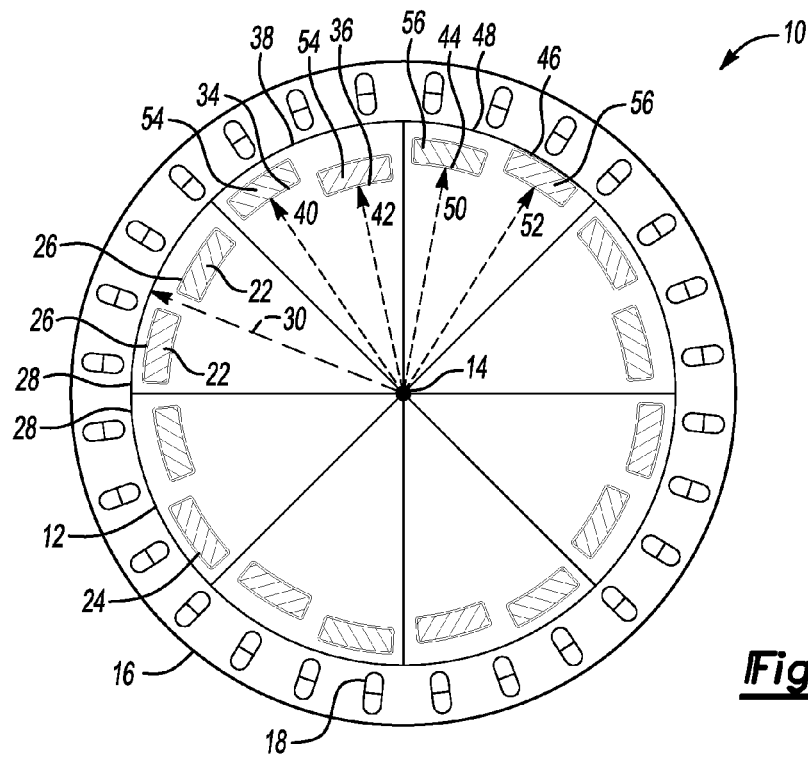
FIG. 1 is a schematic cross-sectional view of an interior permanent magnet machine, in accordance with a first embodiment of the present disclosure.

Referring to the Figures, wherein like reference numbers refer to the same or similar components throughout the several views, FIG. 1 is a schematic cross-sectional view of a single-barrier interior permanent magnet machine 10. The machine 10 includes a rotor 12 having a center 14. The rotor 12 is rotatable within a generally annular stator 16 having a plurality of windings 18. A plurality of slots 22 in the rotor form a barrier 24. The slots 22 extend into the rotor 12 and define a three-dimensional volume having any suitable shape. All or a portion of the slots 22 may be filled with permanent magnets 26. Referring to FIG. 1, the rotor 12 includes a plurality of poles 28, defined by respective pole axes, one of which is generally indicated by reference numeral 30. In the embodiment shown, the rotor 12 has eight poles 28 and sixteen slots 22, however, it may be formed with any number of poles or slots. Each pole 28 is formed at least in part by the magnets 26 in the slots 22. The magnets 26 are configured to be radially asymmetric relative to the center 14, as described below.

Referring to FIG. 1, first and second slots 34, 36 are provided in a first pole 38 and located at first and second distances 40, 42 from the center 14, respectively. Referring to FIG. 1, third and fourth slots 44, 46 are provided in a second pole 48 and located at third and fourth distances 50, 52 from the center 14, respectively. The radial distances may be computed from the center of the respective slots 34, 36, 44, 46. The rotor 12 is configured such that at least one of the first and second distances 40, 42 is different from at least one of the third and fourth distances 50, 52. Referring to FIG. 1, a plurality of first magnets 54 are placed within the first and second slots 34, 36 in the first pole 38. A plurality of second magnets 56 are placed within the third and fourth slots 44, 46 in the second pole 48. The rotor 12 is configured such that at least one of the first magnets 54 is located at a different radial distance from the center 14 relative to at least one of the second magnets 56. Thus the first embodiment illustrates radial asymmetry of the first, second magnets 54, 56 or first, second, third and fourth slots 34, 36, 44, 46 from one pole to another (pole-to-pole radial asymmetry).

Optionally, referring to FIG. 1, three of the first, second, third and fourth distances 40, 42, 50, 52 are the same and one is different. By way of example only, the first, second, third and fourth distances 40, 42, 50, 52 (in mm) may be [48.1, 48.1, 49.1, 48.1]. Optionally, two of the first, second, third and fourth distances 40, 42, 50, 52 are the same and two are different. By way of example only, the distances (in mm) may be [48.1, 48.5, 48.1, 49.5]. Optionally, each of the first, second, third and fourth distances are different with respect to one another. By way of example only, the distances (in mm) may be [49.1, 48.5, 48.1, 49.5]. The minimum difference between the distances 40, 42, 50, 52 may be the tolerance limit for manufacturing the rotor 12. In one example, the manufacturing tolerance limit is 0.1 mm.

Figure 2:
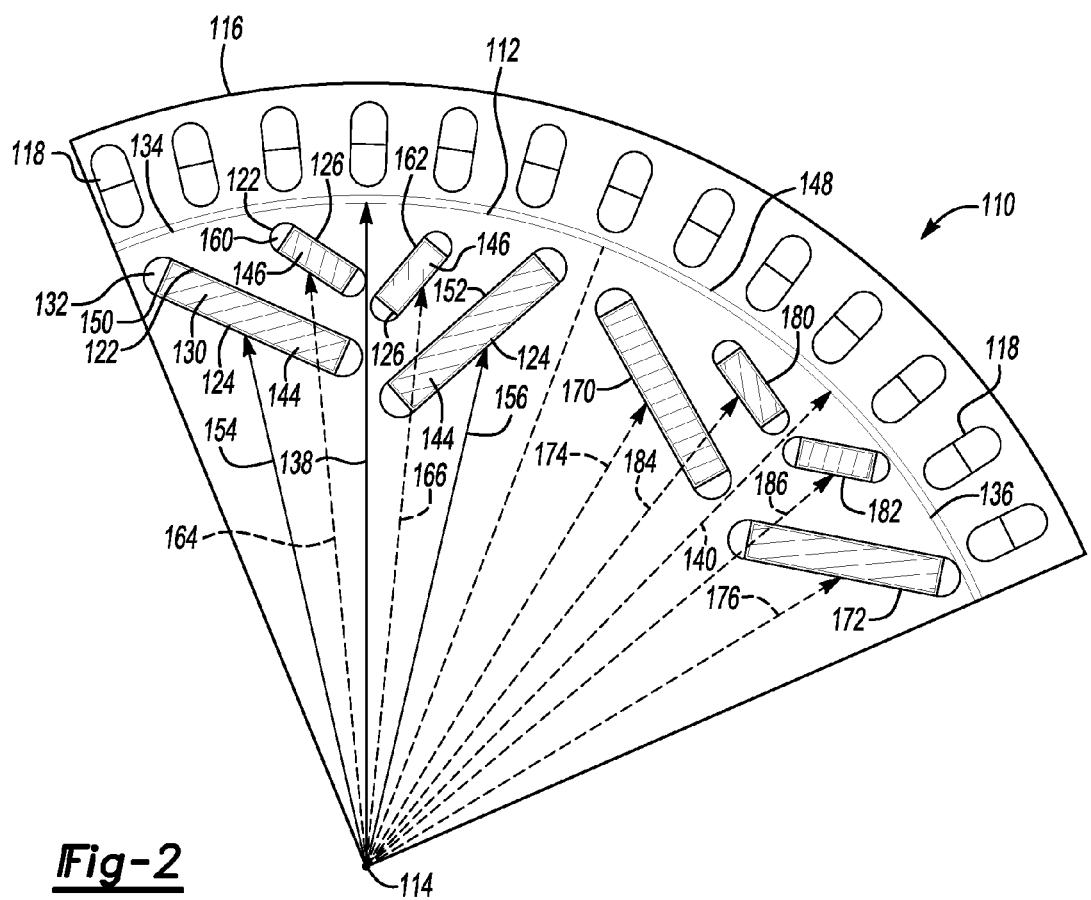
FIG. 2 is a schematic fragmentary cross-sectional view of an interior permanent magnet machine, in accordance with a second embodiment.

FIG. 2 illustrates a schematic fragmentary cross-sectional view of a second embodiment of an interior permanent magnet machine 110. The machine 110 is a double-barrier machine with a rotor 112 having a center 114. The rotor 112 is rotatable within a generally annular stator 116 having a plurality of windings 118. A plurality of slots 122 in the rotor form a first barrier 124 and a second barrier 126. In the embodiment shown, the first barrier 124 is radially inwards of the second barrier 126. Rotors with more than two barriers may also be used. The slots 122 extend into the rotor 112 and define a three-dimensional volume having any suitable shape. All or a portion of the slots 122 may be filled with permanent magnets 130. The rotor 112 may include air pockets 132 incorporated into the structure at various locations with respect to the magnets 130. Referring to FIG. 2, the rotor 112 includes first and second poles 134, 136 defined by respective pole axes 138, 140. The rotor 112 may be formed with any number of poles or slots 122. The first and second poles 134, 136 are formed at least in part by the magnets 130 in the slots 122.

The magnets 130 are configured to be radially asymmetric relative to the center 114, as described below. A plurality of first magnets 144 are positioned within the first barrier 124 in the first pole 134 such that at least one of the first magnets 144 is located at a different radial distance from the center 114 relative to another of the first magnets 144. A plurality of second magnets 146 are positioned within the second barrier 126 in the first pole 134 such that at least one of the second magnets 146 is located at a different radial distance from the center 114 relative to another of the second magnets 146. Thus this embodiment illustrates radial asymmetry of the first and second magnets 144, 146 within one pole.

By way of example only, FIG. 2 shows radially-inner first and second slots 150, 152 provided in the first pole 134 and located at first and second distances 154, 156 from the center 114, respectively. The radial distance may be computed from the center of the first and second slots 150, 152. The first and second slots 150, 152 may be angled with respect to the pole axis 138, thereby defining a concave angle toward an outer surface 148 of the rotor 112. However, any radially-asymmetrical configuration that produces an averaging effect similar to that achieved through traditional skewing of the rotor magnets may be used. Radially-outer third and fourth slots 160, 162 are provided in the first pole 134 and located at third and fourth distances 164, 166 from the center 114, respectively. In one example, the first distance 154 is different from the second distance 156 and the third distance 164 is the same as the fourth distance 166. In another example, the third distance 164 is different from the fourth distance 166 and the first distance 154 is the same as the second distance 156. In another example, the first, second, third and fourth distances 154, 156, 164, 166 are each different with respect to one another. Optionally, the minimum difference between the distances 154, 156, 164, 166 is the tolerance limit for manufacturing the rotor 12. In one example, the manufacturing tolerance limit is 0.1 mm.

Additionally, the second embodiment as shown in FIG. 2 may also incorporate pole-to-pole radial asymmetry. Referring to FIG. 2, radially-inner fifth and sixth slots 170, 172 are provided in the second pole 136 and located at fifth and sixth distances 174, 176 from the center 114, respectively. Radially-outer seventh and eighth slots 180, 182 are provided in the second pole 136 and located at seventh and eighth distances 184, 186 from the center, respectively. In one example, the fifth distance 174 is different from the sixth distance 176 and the seventh distance 184 is the same as the eighth distance 186. In another example, the seventh distance 184 is different from the eighth distance 186 and the fifth distance 174 is the same as the sixth distance 176. In another example, each of the first to the eighth distances 154, 156, 164, 166, 174, 176, 184, 186 are different from one another.

The locations of the magnets 26, 130 in the first and second embodiments may be optimized to obtain the desired level of averaging for the rotor 12. This optimization may be performed empirically or through conventional computer modeling methods known in the art. By way of example only, Design of Experiments (DOE) is a methodology for setting up a set of virtual or physical experiments in which input variables are varied in a systematic manner, for the purpose of determining the correlation between input variables and to predict results or output, as opposed to the one-factor-at-a-time method. For example, the locations of each of the magnets 26 in the rotor 12 may be varied and the output or torque ripple produced observed for resultant changes. In one example, the optimization may be set up with the objective that the torque ripple be between 2 and 5 Newton-meters ("Nm"). The torque ripple may be defined as the difference between the minimum and maximum torque generated during one cycle or revolution. Optionally, the optimization may be set up with the constraint that the minimum average torque generated by the machine is at least 100 Nm. Another constraint may be that the total energy loss in the system is less than or equal to 100 kilo Joules. Another constraint may be that the electromotive force or induced voltage is greater than or equal to 30 Volts.

While the best modes for carrying out the invention have been described in detail, those familiar with the art to which this invention relates will recognize various alternative designs and embodiments for practicing the invention within the scope of the appended claims.

The invention claimed is:

1. An interior permanent magnet machine comprising:
a rotor having a center and a plurality of slots;
a single barrier defined by the plurality of slots in the rotor, such that the rotor includes no more than one of the single barrier;
a plurality of first magnets and a plurality of second magnets disposed within the single barrier;
wherein each of the first magnets is located at a different radial distance from the center relative to each of the second magnets;
a first and a second pole defined by respective pole axes in the rotor;
wherein the first magnets are located in the first pole and the second magnets are located in the second pole, thereby exhibiting pole-to-pole radial asymmetry;
wherein the plurality of slots include first, second, third and fourth slots;
wherein the first and second slots are provided in the first pole and located at first and second distances from the center, respectively;
wherein the third and fourth slots are provided in the second pole and located at third and fourth distances from the center, respectively; and
wherein the first, second, third and fourth distances are each different with respect to one another.

2. An interior permanent magnet machine comprising:
a rotor having a center and a plurality of slots;
a first and a second barrier defined by the plurality of slots in the rotor;
first and second poles defined by respective pole axes;
a plurality of first magnets disposed within the first barrier in the first pole such that at least one of the first magnets is located at a different radial distance from the center relative to another of the first magnets;
a plurality of second magnets disposed within the second barrier in the first pole such that at least one of the second magnets is located at a different radial distance from the center relative to another of the second magnets, thereby exhibiting radial asymmetry within the first pole;
radially-inner first and second slots provided in the first pole and located at first and second distances from the center, respectively;
radially-outer third and fourth slots provided in the first pole and located at third and fourth distances from the center, respectively; and
wherein the first, second, third and fourth distances are each different with respect to one another.

3. The machine of claim 2, wherein each of the first magnets is located at a different radial distance from the center relative to each of the second magnets.

4. The machine of claim 2, further comprising:
radially-inner fifth and sixth slots provided in the second pole and located at fifth and sixth distances from the center, respectively;
radially-outer seventh and eighth slots provided in the second pole and located at seventh and eighth distances from the center, respectively.

5. The machine of claim 4, wherein the fifth distance is different from the sixth distance and the seventh distance is the same as the eighth distance.

6. The machine of claim 4, wherein the seventh distance is different from the eighth distance and the fifth distance is the same as the sixth distance.

7. An interior permanent magnet machine comprising:
a rotor having a center and a plurality of slots;
a first and a second barrier defined by the plurality of slots in the rotor;
first and second poles defined by respective pole axes; and
a plurality of first magnets disposed within the first barrier in the first pole such that at least one of the first magnets is located at a different radial distance from the center relative to another of the first magnets;
a plurality of second magnets disposed within the second barrier in the first pole such that at least one of the second magnets is located at a different radial distance from the center relative to another of the second magnets, thereby exhibiting radial asymmetry within the first pole;
a first and a second pole defined by respective pole axes;
radially-inner first and second slots provided in the first pole and located at first and second distances from the center, respectively; and
radially-outer third and fourth slots provided in the first pole and located at third and fourth distances from the center, respectively;
radially-inner fifth and sixth slots provided in the second pole and located at fifth and sixth distances from the center, respectively;
radially-outer seventh and eighth slots provided in the second pole and located at seventh and eighth distances from the center, respectively; and
wherein each of the eight distances are different from one another.

8. The machine of claim 1, wherein the first, second, third and fourth distances are approximately 49.1, 48.5, 48.1 and 49.5 mm, respectively.

* * * * *